United States Patent
Iwanami et al.

(10) Patent No.: US 6,755,033 B2
(45) Date of Patent: Jun. 29, 2004

(54) HYBRID COMPRESSOR APPARATUS AND METHOD OF CONTROLLING THE SAME

(75) Inventors: Shigeki Iwanami, Okazaki (JP); Keiichi Uno, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/443,798

(22) Filed: May 23, 2003

(65) Prior Publication Data

US 2003/0230093 A1 Dec. 18, 2003

(30) Foreign Application Priority Data

Jun. 12, 2002 (JP) ........................................ 2002-171094

(51) Int. Cl.[7] ................................................. B60H 1/32
(52) U.S. Cl. .............................. 62/133; 62/229; 62/236; 165/43
(58) Field of Search .......................... 62/133, 239, 244, 62/236, 243, 227, 228.1, 228.4, 228.3, 228.5, 230, 229; 165/42, 43

(56) References Cited

U.S. PATENT DOCUMENTS

| | | | | |
|---|---|---|---|---|
| 5,934,089 A | * | 8/1999 | Nakagawa et al. | ............ 62/133 |
| 6,073,456 A | * | 6/2000 | Kawai et al. | ............... 62/133 |
| 6,425,838 B1 | * | 7/2002 | Matsubara et al. | ............. 475/5 |
| 6,427,472 B1 | * | 8/2002 | Nakagawa et al. | ........... 62/430 |
| 6,459,166 B2 | * | 10/2002 | Yanase et al. | ............ 290/40 C |
| 6,470,697 B2 | * | 10/2002 | Nakamura et al. | ............ 62/157 |
| 6,481,225 B2 | * | 11/2002 | Kimura et al. | ................ 62/133 |
| 6,500,089 B2 | * | 12/2002 | Lasson et al. | ................ 477/3 |
| 6,515,448 B2 | * | 2/2003 | Iritani et al. | ................ 320/104 |
| 6,516,621 B2 | * | 2/2003 | Homan et al. | ................ 62/133 |
| 6,543,243 B2 | * | 4/2003 | Mohrmann et al. | ........... 62/230 |
| 6,554,088 B2 | * | 4/2003 | Severinsky et al. | ........ 180/65.2 |

FOREIGN PATENT DOCUMENTS

| | | |
|---|---|---|
| JP | A-2000-130323 | 5/2000 |
| JP | A-2000-289454 | 10/2000 |
| JP | 02003056310 A * | 2/2003 |

* cited by examiner

Primary Examiner—William E. Tapolcai
Assistant Examiner—Mohammad M. Ali
(74) Attorney, Agent, or Firm—Posz & Bethards, PLC (57) ABSTRACT

A hybrid compressor apparatus for a refrigerant cycle is mounted on a vehicle having an engine that stops in accordance with driving conditions of the vehicle. The apparatus includes an electrical motor, a compressor driven by at least one of the engine and the motor for compressing refrigerant in the refrigerant cycle, a controller for controlling operation of the motor and the compressor and for selecting a driving source between the engine and the motor so as to drive the compressor, and a switch for manually setting a normal mode and an economy mode in the refrigerant cycle. The motor drives the compressor when the economy mode is selected while the engine stops. Therefore, an operation load of the compressor can be reduced in the economy mode, and fuel consumption can be reduced.

7 Claims, 8 Drawing Sheets

HYBRID COMPRESSOR APPARATUS AND METHOD OF CONTROLLING THE SAME

CROSS REFERENCE TO RELATED APPLICATION

This application is based on Japanese Patent Application No. 2002-171094 filed on Jun. 12, 2002, the disclosure of which is incorporated herein by reference.

FIELD OF THE INVENTION

The present invention relates to a hybrid compressor apparatus and a method for controlling the hybrid compressor apparatus. The hybrid compressor apparatus is suitably used for an air conditioning system having a compression refrigerant cycle, which is mounted on a vehicle having idle stop function or on a hybrid vehicle.

BACKGROUND OF THE INVENTION

Recently, in order to reduce a fuel consumption of an automotive vehicle, an automotive vehicle having idle stop function and a hybrid automotive vehicle are used. These vehicles are required to stop their engines in accordance with driving conditions. For example, in a vehicle having the idle stop function, an engine is required to stop when the vehicle stops temporarily, for example, at traffic lights. In a hybrid vehicle, an engine is required to stop when the vehicle stops temporarily, when the vehicle starts, and when the vehicle drives at a low speed. However, a compressor in an air conditioning system, which is driven by an engine in general, is required for operating, even when the engine stops.

In a hybrid compressor described in JP-A-2000-130323, an electromagnetic clutch connects between a pulley of an engine and the compressor, and a rotation shaft of the compressor disposed on an opposite side of the pulley connects to a motor. When the engine stops, the clutch disconnects between the pulley and the compressor, and the motor drives the compressor so that an air conditioning system is operated. In the above hybrid compressor, the motor needs to generate a large torque for driving the compressor. However, the size of the motor is limited because of its mounting performance and its manufacturing cost. Therefore, when the air conditioning system is required to operate under high cooling load such as during the daytime in high summer, the compressor is driven by the engine instead of the motor because the motor does not generate enough torque to drive the compressor. Thus, the idle stop function does not work efficiently for reducing a fuel consumption of the vehicle.

SUMMARY OF THE INVENTION

In view of the above problem, it is an object of the present invention to provide a hybrid compressor apparatus for a refrigerant cycle in the vehicle with an engine that is required to stop in accordance with driving conditions of the vehicle. This hybrid compressor apparatus effectively improves fuel consumption efficiency in the vehicle.

The hybrid compressor apparatus includes a motor, a compressor driven by at least one of the engine and the motor so as to compress refrigerant in the refrigerant cycle, a controller for controlling operation of the motor and the compressor and for selecting a driving source between the engine and the motor so as to drive the compressor, and a switch manually operated by a passenger of a passenger compartment so that the refrigerant cycle is operated in a normal mode or in an economy mode. In the hybrid compressor apparatus, when the economy mode is set while the engine stops, the motor drives the compressor. Therefore, a fuel consumption efficiency of the vehicle can be improved. Although a generating torque of the motor is limited, an operation load of the compressor can be reduced in a case of the economy mode, which is selected by the passenger. Thus, in the economy mode, the engine stops, and the compressor is operated only by the motor as much as possible, so that a fuel consumption of the vehicle can be reduced.

Preferably, the controller has a detecting unit for detecting an actual temperature at a predetermined position of the passenger compartment, and a determining means for determining a target temperature based on at least one of a setting temperature set by the passenger and the environmental conditions of the vehicle. In the economy mode while the engine stops, the motor drives the compressor even when the actual temperature is higher than the target temperature. More preferably, in the economy mode, the controller can change the target temperature to a modified target temperature, which is higher than the target temperature by a predetermined amount. Therefore, the load of the compressor can be effectively reduced.

Further, it is preferable that the controller has a determining means for determining an acceptable temperature that is an upper limit temperature, when the compressor is driven by the motor in the economy mode. In this case, when the actual temperature exceeds the acceptable temperature in the economy mode, the controller requests the engine to start and the motor to stop so that the compressor is driven by the engine. Therefore, air-conditioning feeling given to the passenger can be improved, while the fuel consumption efficiency can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
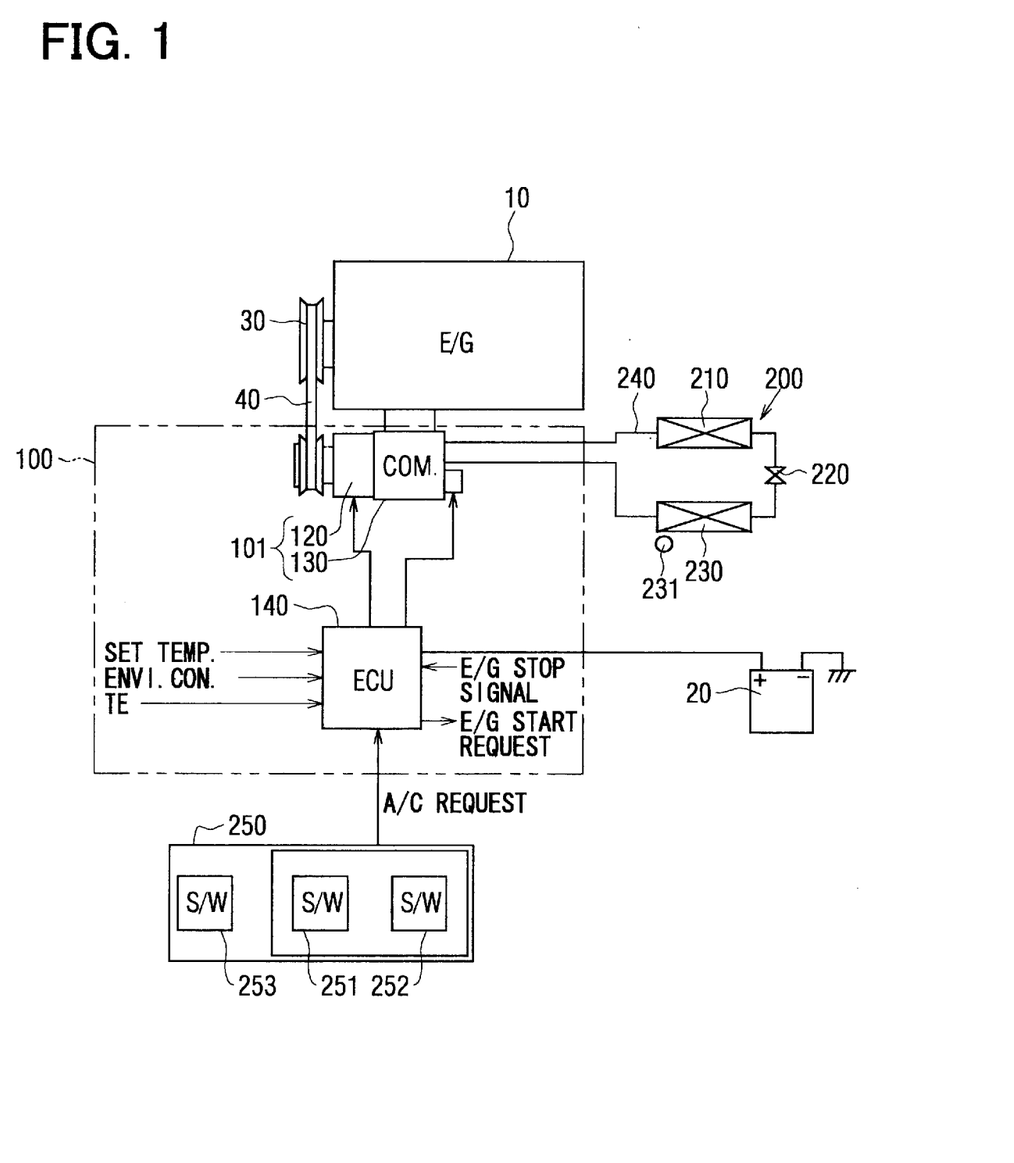
FIG. 1 is a schematic diagram showing a refrigerant cycle system with a hybrid compressor, according to preferred embodiments of the present invention.

A hybrid compressor apparatus 100 according to a first embodiment of the present invention is typically used for a refrigerant cycle system 200 for an air conditioner, which is mounted on a hybrid vehicle, as shown in FIG. 1. Here, an engine 10 of the hybrid vehicle is required to stop in accordance with driving conditions of the vehicle. The refrigerant cycle system 200 provides a well-known compression refrigerant cycle, including a hybrid compressor 101. The hybrid compressor apparatus 100 includes the hybrid compressor 101 and a controller 140. The hybrid compressor 101 is composed of a compressor 130 and a motor 120.

In the refrigerant cycle system 200, refrigerant flows through the hybrid compressor 130, a condenser 210, an expansion valve 220, and an evaporator 230, in this order. Those compartments of the refrigerant cycle system 200 are connected by a refrigerant passage 240 to form a closed refrigerant circuit. The compressor 130 compresses the refrigerant to high-temperature and high-pressure, and the condenser 210 condenses and liquidizes the compressed refrigerant from the compressor 130. The expansion valve 220 adiabatically expands and decompresses the condensed refrigerant. The evaporator 230 evaporates the expanded refrigerant so that air flowing through the evaporator 230 is cooled by latent heat of evaporation. A temperature sensor 231 is disposed downstream from the evaporator 230 in an air-flow passage, and detects the temperature of the cooled air flowing from the evaporator 230, i.e., the actual temperature TE of the air in an outlet side of the evaporator 230.

Figure 2:
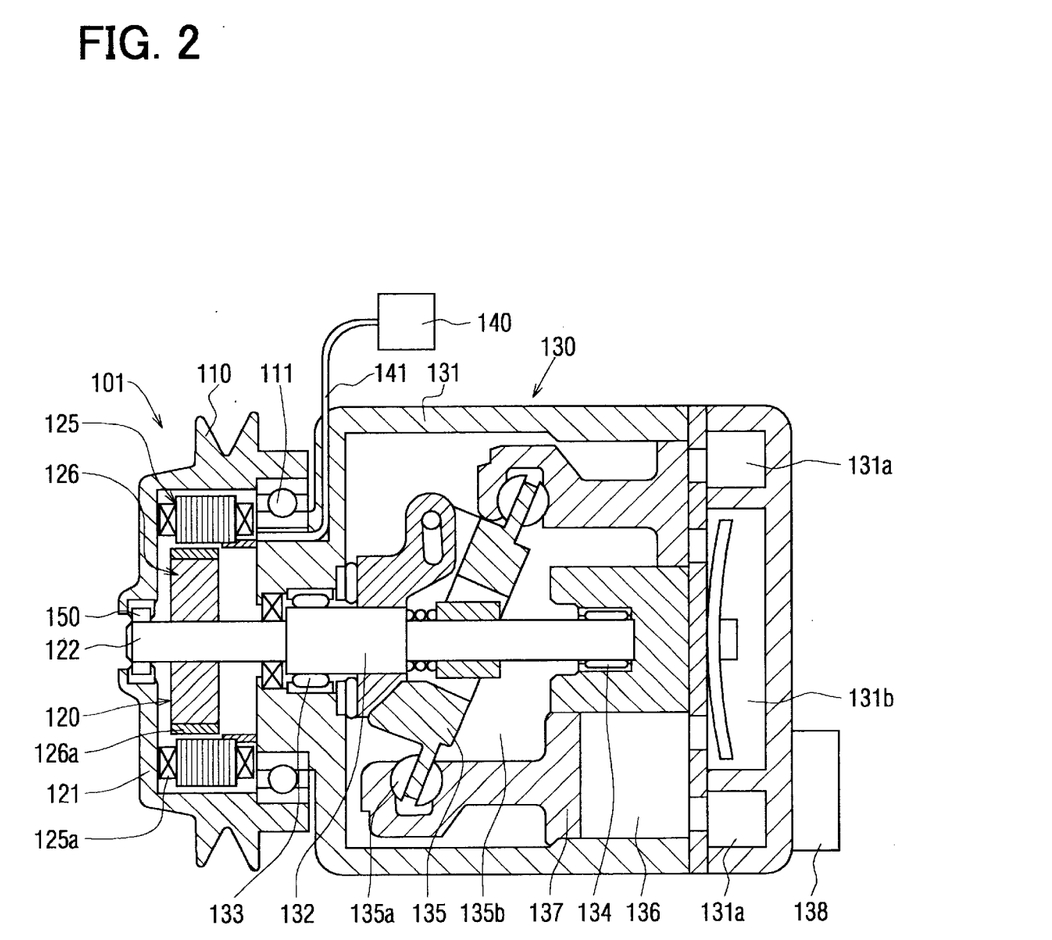
FIG. 2 is a cross-sectional view showing a hybrid compressor according to a first embodiment.

Next, the hybrid compressor 101 is described in detail with using FIG. 2. The hybrid compressor 101 includes the motor 120 and the compressor 130, as described above. The motor 120 has a stator 125 and a rotor 126, which are disposed in a motor housing 121. The motor housing 121 has a motor pulley 110, which is disposed on an outer periphery of the motor housing 121 and is integrated with the motor housing 121. The motor pulley 110 is supported rotatably by a bearing 111 that is fixed to a compressor housing 131.

The stator 125 is disposed in an inner circumferential surface of the motor housing 121, and has a stator coil 125a. The stator 125 is fixed to the compressor housing 131. The rotor 126 is disposed on an inner circumferential side of the stator 125, and has a permanent magnet 126a. The rotor 126 is fixed to a rotation shaft 122. The rotation shaft 122 of the motor 120 connects to a driving shaft 132 of the compressor 130, and both the rotation shaft 122 and the driving shaft 132 are rotatable. A power supply 20 such as a battery supplies electricity to the stator coil 125a through a cable 141. The power supply 20 is controlled by an inverter (not shown), which is disposed in the controller 140. Therefore, the electricity is controllably supplied to the stator coil 125a so that a rotation speed of the motor 120 is controllable and variable.

A one-way clutch 150 is disposed between the top end of the rotation shaft 122 and the motor pulley 110. When the engine 10 runs, the driving force of the engine 10 is transmitted to the motor pulley 110 through a crank pulley 30 and a belt 40, as shown in FIG. 1. Then, the motor pulley 110 rotates, and the clutch 150 is engaged with the rotation shaft 122 so that the driving force of the engine 10 is transmitted to the rotation shaft 122. When the engine 10 stops, the motor 120 drives and rotates to the same rotational direction as that of the engine 10 so that the clutch 150 is disengaged. Thus, the motor 120 drives the compressor 130 even when the motor pulley 110 stops together with the engine 10.

The compressor 130 is a swash-plate variable displacement compressor, and the controller 140 variably controls a displacement by one rotation cycle of a shaft in the compressor 130. The compressor 130 includes a swash plate 135, which is formed on the driving shaft 132 rotatably supported by bearings 133, 134. The swash plate 135 is disposed in a swash plate room 135b, and connects to a plurality of pistons through a plurality of shoes 135a, which is formed on peripheral ends of the swash plate 135.

A control valve 138 is disposed on an axial end side of the compressor 130, which is opposite to the motor 120. The control valve 138 adjusts an opening degree, so that a pressure of a discharge room 131b is released to the swash plate room 135b and/or a pressure of the swash plate room 135b is released to a suction room 131a. Thus, the pressure in the swash plate room 135b is regulated. Moreover, a slant angle of the swash plate 135 is changeable and a stroke of the piston 137 is also changeable so that the displacement of the compressor 130 can be varied.

As shown in FIG. 1, plural signals such as an engine stop signal, a setting temperature signal, an environmental condition signal, an actual temperature TE signal from the temperature sensor 231, an air conditioner request signal (i.e., A/C request) and the like are input to the controller 140. The engine stop signal is generated when the engine 10 stops in accordance with the driving conditions of the vehicle. When a passenger manually operates a switch for setting a setting temperature of a passenger compartment, the setting temperature signal is generated. The environmental condition signal is concerned with an outside air temperature TAM outside the vehicle, an inner air temperature inside the passenger compartment, and amount of solar radiation entering the passenger compartment. The A/C request signal is output from an air conditioner panel 250 (i.e., an A/C panel). According to these signals, the controller 140 outputs an engine-start request signal, if necessary. Moreover, the controller 140 controls operation of the motor 120, i.e., operation of the compressor 130, and controls the displacement of the compressor 130.

The A/C panel 250 is disposed in the passenger compartment near the driver's seat. The A/C panel 250 includes an A/C switch 251, an economy operation switch 252, and an A/C off switch 253. Passenger selects and manually operates these switches. When the passenger selects the A/C switch 251 to operate the refrigerant cycle system.200, a signal for setting a normal mode is input from the A/C switch 251 to the controller 140. When the- passenger selects the economy operation switch 252, a signal for setting an economy mode is input from the economy operation switch 252 to the controller 140. When the passenger selects the A/C off switch 253 for stopping the refrigerant cycle system 200, a stop signal is input from the A/C off switch 253 to the controller 140.

The normal mode and the economy mode are set in different of operation ranges of the compressor 130 in accordance with the actual temperature TE of the air flowing from the evaporator 230. In the normal mode, the compressor 130 operates while the actual temperature TE is controlled equal to or above 3° C.–4° C. In the economy mode, the compressor 130 operates while the actual temperature TE is controlled equal to or above 10° C.–11° C. In other words, in the normal mode, the compressor 130 works more frequently than that in the economy mode, so that an operation load of the compressor 130 in the normal mode is higher than that in the economy mode. Therefore, an air conditioning performance of the refrigerant cycle system 200 in the normal mode is higher than that in the economy mode. Reversely, the operation load of the compressor 130 in the economy mode is low so that the driving force for driving the compressor 130 can be reduced.

Figure 3:
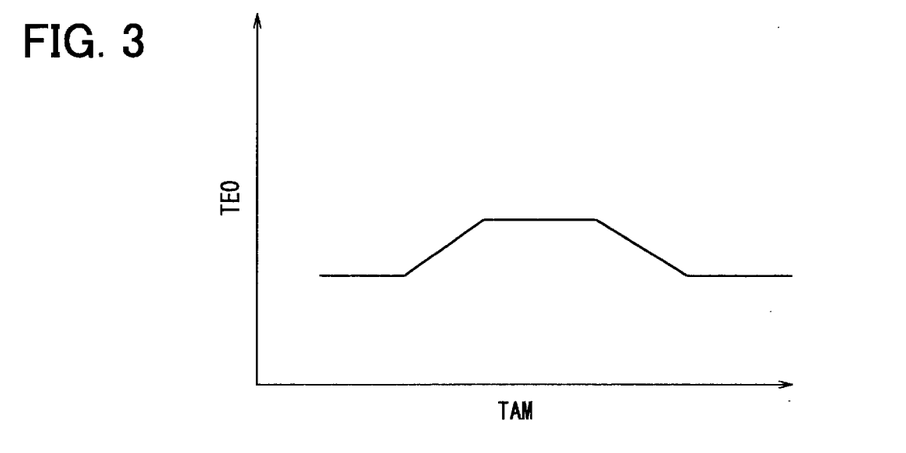
FIG. 3 is a graph showing a relationship between a target temperature (TEO) and an outside air temperature (TAM), according to the first embodiment.

The controller 140 calculates a target temperature TEO of air from the evaporator 230. The controller 140 controls the compressor 130 so that the actual temperature TE approaches the target temperature TEO. Here, the target temperature TEO is set to be changed in accordance with the outside air temperature TAM that is one of environmental conditions, as shown in FIG. 3. Therefore, the target temperature TEO is determined in accordance with the outside temperature. In other words, a difference between the actual temperature TE and the target temperature TEO can be defined as a required cooling capacity of the refrigerant cycle system 200. As the difference between the actual temperature TE and the target temperature TEO becomes larger, the required cooling capacity of the refrigerant cycle system 200 also becomes large.

The hybrid compressor apparatus 100 operates as follows. When the vehicle runs and the engine 10 also runs, the driving force of the engine 10 is transmitted to the motor pulley 110 through the crank pulley 30 and the belt 40. Then, the driving force is transmitted to the rotation shaft 122 and the driving shaft 132 through the one-way clutch 150, so that the engine 10 drives the compressor 130. In this case, the controller 140 controls the displacement of the compressor 130 by adjusting the opening degree of the control valve 138 in accordance with the required cooling capacity of the refrigerant cycle system 200.

When the engine 10 stops while a vehicle stops temporarily, starts, or runs at low-speed, the compressor 130 operates in accordance with an input signal, which corresponds to the passenger's selection among the A/C switch 251, the economy operation switch 252. This embodiment is characterized in that a control of the hybrid compressor apparatus 100 is performed in accordance with the input signal from the A/C switch 251, the economy operation switch 251 or the A/C off switch 253. The control is described as follows.

Figure 4:
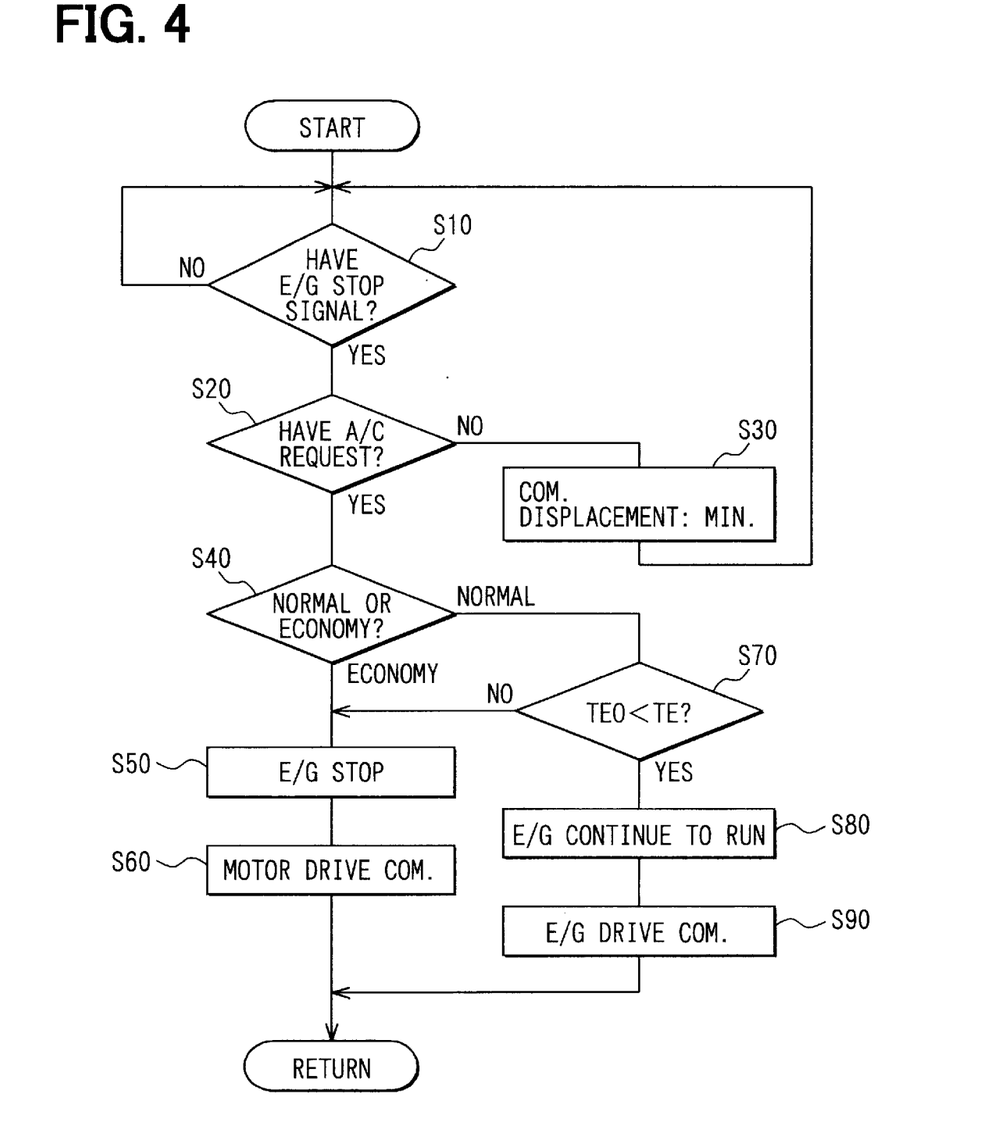
FIG. 4 is a flow diagram showing a method of controlling the hybrid compressor when an engine stops, according to the first embodiment.

As shown in FIG. 4, at step S10, it is determined whether there is an engine stop signal. When the controller 140 detects the engine stop signal at step S10, it goes to step S20. When the controller 140 does not detect the engine stop signal, i.e., the engine 10 runs, it returns to the start, and the engine 10 drives the compressor 130. At step S20, the controller. 140 determines whether the controller 140 detects the A/C request signal. When the controller 140 does not detect the A/C request signal, e.g., when a passenger selects the A/C off switch 253, the displacement of the compressor 130 becomes minimized at step S30. The compressor 130 needs not to operate, so that the displacement of the compressor 130 is generally zero, at step S30. Then, it returns to the start.

When the controller 140 detects the A/C request signal at step S20, the controller 140 determines at step S40 whether the normal mode signal or the economy mode signal is inputted. When the controller 140 detects the economy mode signal, the engine 10 stops at step S50. Then, the motor 120 drives the compressor 130 at step S60. In this case, the refrigerant cycle system 200 operates economically.

On the other hand, when the controller 140 determines the normal mode at step S40, it is determined at step S70 whether the actual temperature TE is higher than the target temperature TEO. When the actual temperature TE is not higher than the target temperature TEO, it goes to step S50, because the required cooling capacity of the refrigerant cycle system 200 is comparatively low. Similar to the above-mentioned case, the engine 10 stops at step S50, and the motor 120 drives the compressor 130 at step 560.

When the actual temperature TE is higher than the target temperature TEO, the engine 10 continues to run at step S80, and the engine 10 drives the compressor 140 at step S90. In this case, the required cooling capacity of the refrigerant cycle system 200 is comparatively high.

Figure 5:
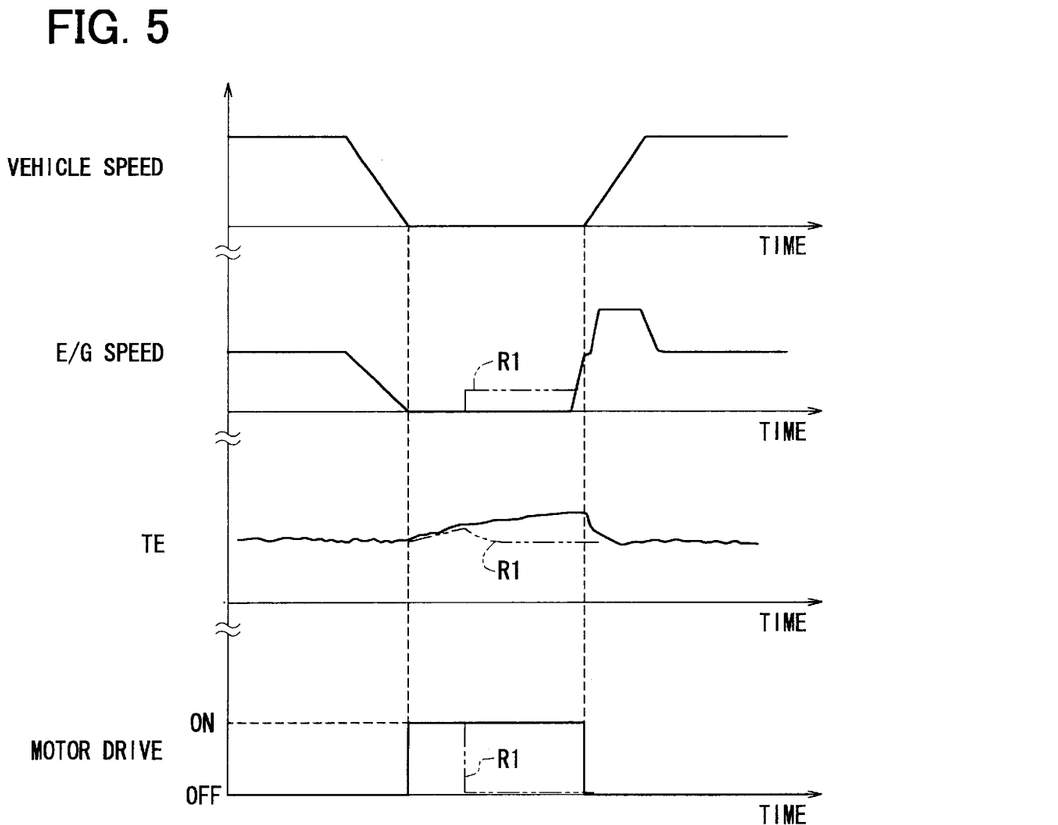
FIG. 5 is a timing chart showing a vehicle speed, an engine speed, an actual temperature (TE) of an evaporator, and a motor drive state, according to the first embodiment.

FIG. 5 shows a timing chart of a vehicle speed, an engine speed, the actual temperature TE of the air flowing from the evaporator 230, and a motor drive state. In FIG. 5, R1 shows a reference case where a hybrid compressor is operated and a passenger selects an economy operation switch. In this reference R1, a controller does not determine whether the economy mode signal is input. Therefore, when an actual temperature TE increases, an engine starts and a motor stops, so that the engine drives the compressor.

The solid line in FIG. 5 shows control operation of the first embodiment when the hybrid compressor apparatus 100 is operated and the passenger selects the economy operation switch 252. In this case, even when the actual temperature TE increases more than the target temperature TEO, the engine 10 does not start and the motor 120 runs, so that the motor 120 drives the compressor 130. Therefore, although a generating torque of the motor 120 is limited, the operation load of the compressor 130 can be reduced in the economy mode, which is selected by the passenger. Thus, in this case, the engine 10 does not start, and the motor 120 drives the compressor 130 in the refrigerant cycle system 200 as much as possible, so that a fuel consumption efficiency of the vehicle can be improved.

Second Embodiment

Figure 6:
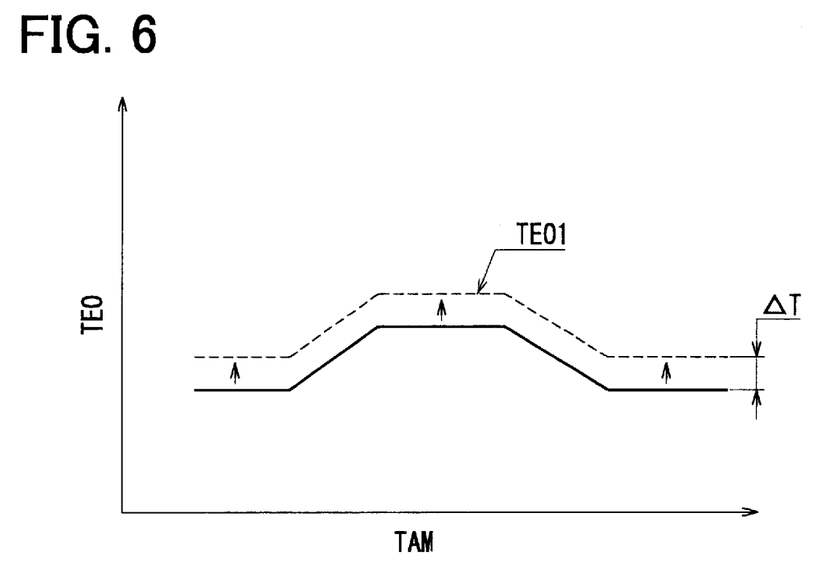
FIG. 6 is a graph showing a relationship between a target temperature (TEO) and the outside air temperature (TAM), according to a second embodiment of the present invention.
Figure 7:
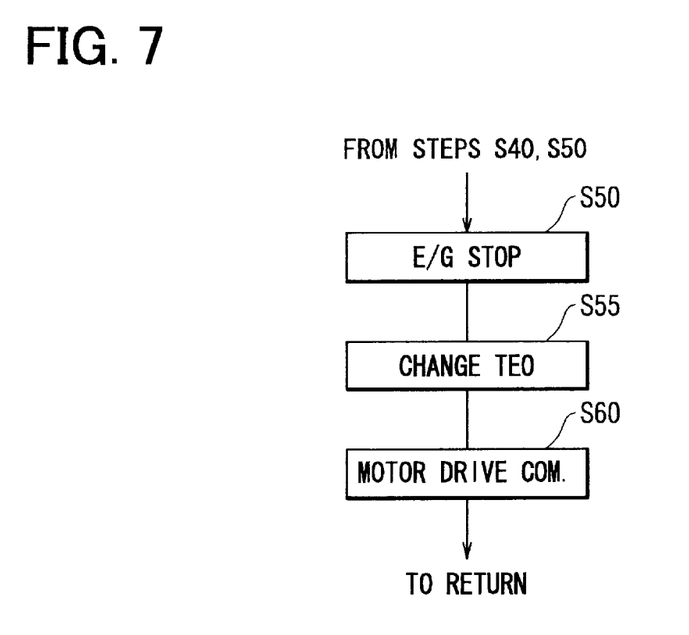
FIG. 7 is a flow diagram showing a main control of a hybrid compressor, according to the second embodiment.

A hybrid compressor apparatus 100 according to the second embodiment will be described with reference to FIGS. 6–8. As shown in FIG. 7, additional new step S55 is added between step S50 and step S60 shown in FIG. 4. At step S55, the target temperature TEO changes when the economic mode is selected. In other words, when a passenger selects the economy operation switch 252, the controller 140 changes the target temperature TEO to a modified target temperature TEO1, which is higher than the target temperature TEO by a predetermined amount ΔT. The modified target temperature TEO1 is shown as a dotted line in FIG. 6.

When the engine 10 stops and the refrigerant cycle system 200 is operated in the economy mode, the target temperature TEO changes to the modified target temperature TEO1, and then the motor 120 drives the compressor 130 so that the refrigerant cycle system 200 is operated. In this case, the operation load of the compressor 130 can be reduced. Therefore, the operation load of the motor 120 for driving the compressor 130 is also reduced, as shown in FIG. 8. In FIG. 8, when the vehicle stops and the engine 10 stops, the actual temperature TE of the air flowing from the evaporator 230 increases. When the actual temperature TE is higher than the target temperature TEO, the motor 130 drives the compressor 130. Then, the controller 140 changes the target temperature TEO to the modified target temperature TEO1 so that the load of the motor 130 is reduced. For example, the motor 130 stops, when the actual temperature TE is lower than the modified target temperature TEO1. On the other hand, when the actual temperature TE is higher than the modified target temperature TEO1, the motor 130 re-starts.

Figure 8:
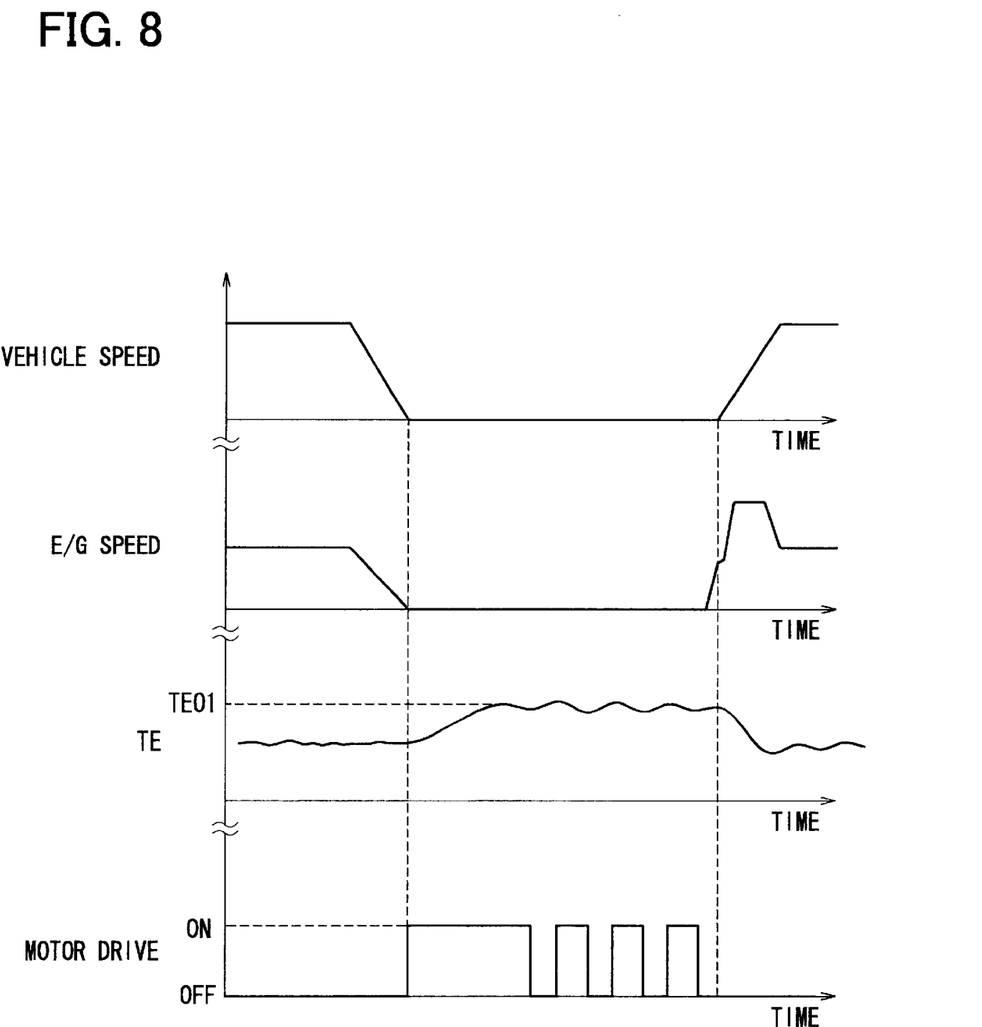
FIG. 8 is a timing chart showing a vehicle speed, an engine speed, an actual temperature (TE) of the evaporator, and a motor drive state, according to the second embodiment.

The motor 130 repeats to run and to stop as shown in FIG. 8, so that an energy consumption of the motor 130 can be reduced. In the second embodiment, the other parts are similar to those of the above-described first embodiment.

Third Embodiment

Figure 9:
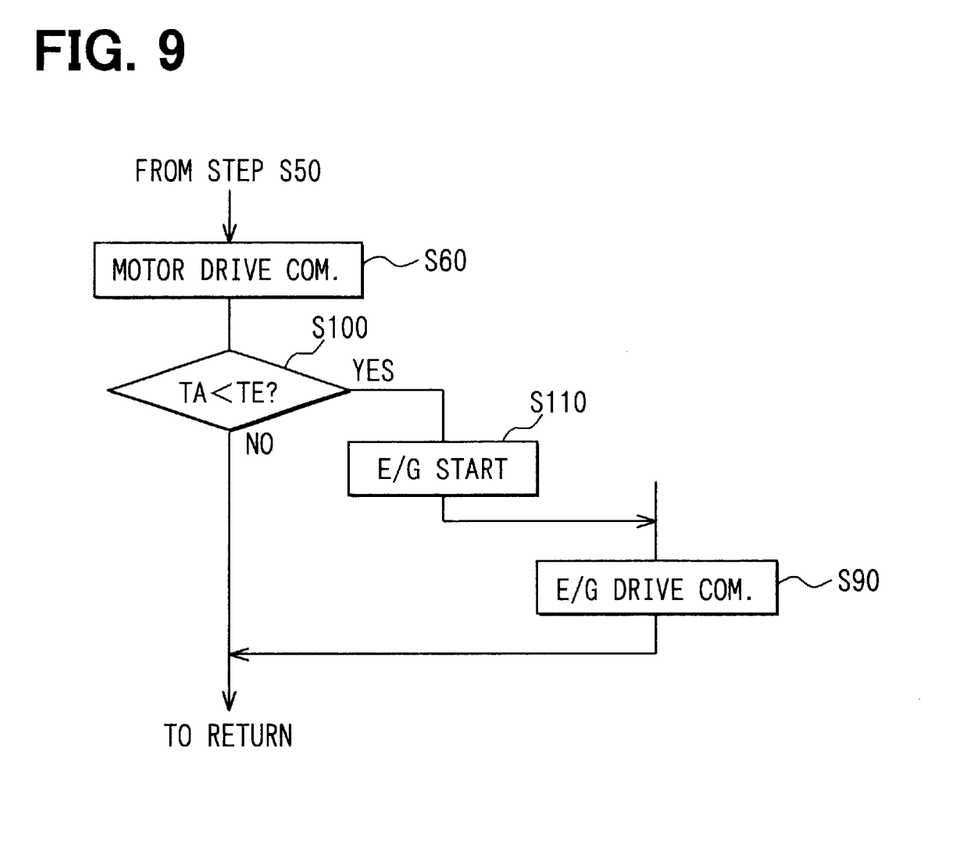
FIG. 9 is a flow diagram showing a main control of a hybrid compressor, according to a third embodiment of the present invention.

A hybrid compressor apparatus according to the third embodiment will be now described with reference to FIGS. 9 and 10. In the third embodiment, two new steps S100 and S110 are added after step S60 shown in FIG. 4. An acceptable temperature TA is predetermined in the economy mode for the actual temperature TE.

When the engine 10 stops and the motor 120 drives the compressor 130 at step S60, the actual temperature TE of the air flowing from the evaporator 230 increases. At step S100, the controller 140 determines whether the actual temperature TE is higher than the acceptable temperature TA. When the actual temperature TE is not higher than the acceptable temperature TA, the motor 120 drives the compressor 130, and the engine 10 keeps stopping. When the actual temperature TE is higher than the acceptable temperature TA, the motor 120 stops, and the engine 10 starts its operation at step S110. Then, the engine 10 drives the compressor 130 at step S90. Hear, the acceptable temperature TA is an upper limit temperature in a temperature range of the actual temperature TE, where the compressor 130 is operated by the motor 120 in the economy mode.

Figure 10:
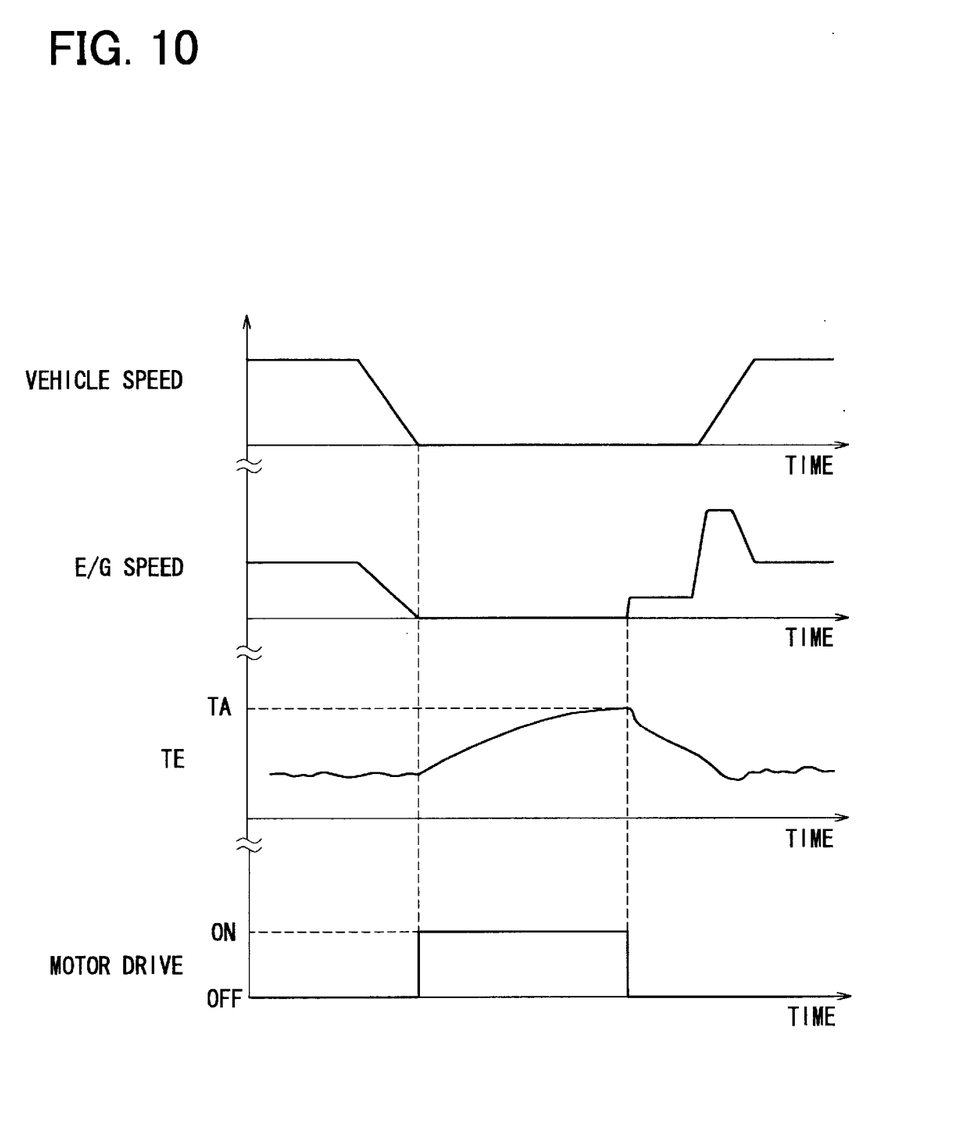
FIG. 10 is a timing chart showing a vehicle speed, an engine speed, an actual temperature. (TE) of the evaporator, and a motor drive state, according to the third embodiment.

As shown in FIG. 10, when the vehicle stops and the engine 10 also stops, the actual temperature TE increases, and the motor 120 starts to run and drives the compressor 130. When the actual temperature TE is higher than the acceptable temperature TA, the motor 120 stops, and the engine 10 starts to run so that the engine 10 drives the compressor 130.

In this way, the actual temperature TE does not exceed the acceptable temperature TA. Therefore, a passenger can drive a vehicle comfortably. In the third embodiment, the other parts are similar to those of the above-described first embodiment.

Modifications

Although the actual temperature TE and the target temperature TEO are temperatures of the air flowing from the evaporator 230, another definition of the actual temperature TE and the target temperature TEO can be used in this invention. For example, the actual temperature TE is defined as a temperature of the air blown from a blowing outlet of an air conditioning unit into the passenger compartment or a temperature in a passenger compartment. Although the target temperature TEO is determined by the temperature of the outside air outside the passenger compartment, another determination of the target temperature TEO can be used in this invention. For example, the target temperature TEO is determined by a setting temperature that is set by a passenger or by environmental conditions.

Although the one-way clutch 150 is used in the hybrid compressor 101, an electromagnetic clutch can be used in the hybrid compressor 101. In this case, the displacement of the compressor may be fixed. That is, the compressor 130 maybe a fixed displacement type compressor.

Moreover, the hybrid compressor apparatus 100 can be applied to an idle stop vehicle, where an engine stops when the vehicle temporally stops such as a case at traffic lights.

Such changes and modifications are to be understood as being within the scope of the present invention as defined by the appended claims.

What is claimed is:

1. A hybrid compressor apparatus for a refrigerant cycle of a vehicle having an engine that stops in accordance with driving conditions of the vehicle, the hybrid compressor apparatus comprising:
   an electrical motor;
   a compressor driven by at least one of the engine and the motor, for compressing refrigerant in the refrigerant cycle;
   a controller for controlling operation of the motor and the compressor, the controller selecting a driving source between the engine and the motor so as to drive the compressor; and
   a switch manually operated by a passenger of a passenger compartment so that the refrigerant cycle is operated in a normal mode or in an economy mode, wherein:
      the controller has a detecting unit for detecting an actual temperature at a predetermined position of the passenger compartment, and a determining means for determining a target temperature based on at least one of a setting temperature set by the passenger and the environmental conditions of the vehicle, and
      in the economy mode, while the engine is stopped, the controller selects the motor as the driving source and the motor drives the compressor even when the actual temperature is higher than the target temperature.

2. The hybrid compressor apparatus according to claim 1, wherein, in the economy mode, the controller changes the target temperature to a modified target temperature that is higher than the target temperature by a predetermined amount.

3. The hybrid compressor apparatus according to claim 1, wherein:
   the controller has a determining means for determining an acceptable temperature that is an upper limit temperature when the compressor is driven by the motor in the economy mode; and
   when the actual temperature exceeds the acceptable temperature in the economy mode, the controller requests the engine to start and the motor to stop so that the compressor is driven by the engine.

4. The hybrid compressor apparatus according to claim 1, wherein, when the actual temperature is higher than the target temperature in the normal mode, the compressor is operated by the engine.

5. The hybrid compressor apparatus according to claim 1, wherein, when the actual temperature is not higher than the target temperature in the normal mode, the compressor is operated by the motor.

6. A method of controlling a hybrid compressor apparatus for a refrigerant cycle in a vehicle having an engine that stops in accordance with driving conditions of the vehicle, wherein the hybrid compressor apparatus includes a compressor driven by at least one of the engine and an electrical motor for compressing refrigerant in the refrigerant cycle, the method comprising:
   determining whether the engine is stopped;

determining whether a switch is manually selected to a normal mode or an economy mode; and controlling operation of the motor and the compressor, wherein:

in the controlling, when the economy mode is set while the engine is stopped, the motor drives the compressor even when an actual temperature at a predetermined position of a passenger compartment is higher than a target temperature, which is determined based on at least one of a setting temperature set by the passenger and environmental conditions of the vehicle; and when the economy mode is determined, the target temperature is changed to a modified target temperature that is higher than the target temperature by a predetermined amount.

7. A method of controlling a hybrid compressor apparatus for a refrigerant cycle in a vehicle having an engine that stops in accordance with driving conditions of the vehicle, wherein the hybrid compressor apparatus includes a compressor driven by at least one of the engine and an electrical motor for compressing refrigerant in the refrigerant cycle, the method comprising:

determining whether the engine is stopped;

determining whether a switch is manually selected to a normal mode or an economy mode;

controlling operation of the motor and the compressor, wherein, in the controlling when the economy mode is set while the engine is stopped, the motor drives the compressor even when an actual temperature at a predetermined position of a passenger compartment is higher than a target temperature, which is determined based on at least one of a setting temperature set by the passenger and environmental conditions of the vehicle;

determining whether the actual temperature exceeds an acceptable temperature when the engine stops and the refrigerant cycle is operated in the economy mode; and requesting the engine to start and the motor to stop so that the engine drives the compressor when the actual temperature exceeds the acceptable temperature.

* * * * *